United States Patent [19]

Kummler et al.

[11] 4,362,690

[45] Dec. 7, 1982

[54] PYROCHEMICAL PROCESSES FOR THE DECOMPOSITION OF WATER

[75] Inventors: Ralph H. Kummler, Birmingham; Richard J. Leite, Ann Arbor, both of Mich.

[73] Assignee: Texas Gas Transmission Corporation, Owensboro, Ky.

[21] Appl. No.: 725,339

[22] Filed: Sep. 21, 1976

Related U.S. Application Data

[63] Continuation-in-part of Ser. No. 548,231, Feb. 10, 1975, abandoned.

[51] Int. Cl.³ .............................................. G21B 1/00
[52] U.S. Cl. .................................. 376/148; 376/324; 423/415 A; 423/655; 423/658
[58] Field of Search .................................. 176/1, 9, 39; 204/157.1 H, DIG. 11; 423/644, 648, 655, 657, 658, 415 A, 437, 579; 376/148, 324

[56] References Cited

U.S. PATENT DOCUMENTS

| | | | |
|---|---|---|---|
| 3,489,645 | 1/1970 | Daiber et al. | 176/1 |
| 3,802,993 | 4/1974 | Fredersdorff | 176/39 |
| 3,821,358 | 6/1974 | Interrante et al. | 423/657 |
| 3,821,362 | 6/1974 | Spacil | 423/657 |
| 3,842,164 | 10/1974 | Wentorf, Jr. | 423/657 |
| 4,097,348 | 6/1978 | Gomberg | 376/148 |
| 4,121,984 | 10/1978 | Gomberg et al. | 376/148 |
| 4,140,603 | 2/1979 | Gomberg | 376/148 |

FOREIGN PATENT DOCUMENTS

| | | | |
|---|---|---|---|
| 2443696 | 5/1975 | Fed. Rep. of Germany | 423/648 |
| 2445953 | 5/1975 | Fed. Rep. of Germany | 423/648 |
| 2449230 | 5/1975 | Fed. Rep. of Germany | 176/9 |
| 908469 | 10/1962 | United Kingdom | 176/39 |

OTHER PUBLICATIONS

"A Hydrogen-Energy System", Prepared for American Gas Association by Institute of Gas Technology, by D. P. Gregory, Catalog No. L. 21173, 8/72, pp. (III-42-)–(III-68).
Matt–1050, 8/74, pp. 526–529.
Technology Review 12/76, pp. 20–24, 32–34, 39, 41–43.
Exploding Reactors for Power, Marwick, pp. 11, 12, 1/73.
Wash–1267, 7/73, pp. 5, 6, 10, 12, 13, 20, 21.
Technology Review, 12/76, pp. 20–33, 39, 42, 43.
NSENAO-58, No. 2, 10/75, pp. 107, 108, 118, 119.

Primary Examiner—Harvey E. Behrend
Attorney, Agent, or Firm—Laurence R. Brown

[57] ABSTRACT

Improved closed-loop pyrochemical processes for the decomposition of water in which at least one reaction step in each process has a high energy requirement that may be expressed in standard Gibbs free energy change terms of more than 10 to 20 kcal/mole at 298° K., $\Delta G°_{298}$. Such high energy steps are carried out in the central reaction chamber of a thermonuclear reactor wherein the energy of intense shock waves, hereinafter called the blast waves, caused by a pellet-by-pellet intermittent thermonuclear reaction provides an automatic drive for the process step kinetics. During the radial outward propagation of the blast wave reaction materials within the chamber are heated and compressed within the blast wave and entrained behind the blast wave. The product density immediately behind the blast wave remains directly proportional to the ambient density ahead of the wave. Chemical reaction thus takes place dynamically in transit at very high temperatures and pressures in a manner that permits the chemical reaction to absorb energy, and without confinement in a vessel requiring high pressure and high temperatures chronically. In this way, the process step having a high energy change requirement is accomplished in one high-energy reaction step rather than in several low and intermediate reaction steps having an energy sum which equals the required total.

4 Claims, 1 Drawing Figure

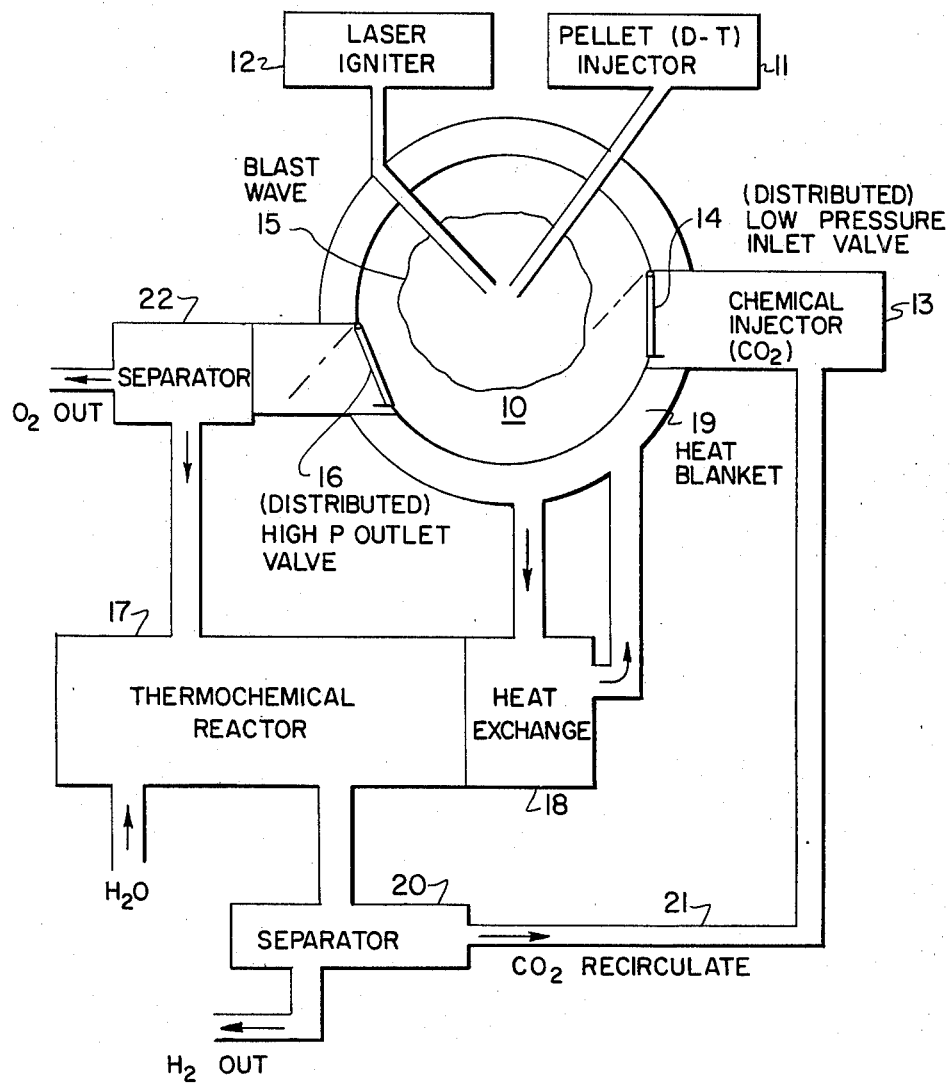

PYROCHEMICAL PROCESSES FOR THE DECOMPOSITION OF WATER

This application is a continuation-in-part of U.S. Ser. No. 548,231 filed Feb. 10, 1975, now abandoned.

The present invention relates to water decomposition processes and, more particularly, to closed-loop water decomposition processes having at least one high energy reaction step which has a standard Gibbs free energy change of more than 10 to 20 kcal/mole at 298° K.

BACKGROUND OF THE INVENTION

At the present stage of the art, laser fusion D-T pellets are commercially available as well as laser train and target chambers. Reported yields from laser fusion thermonuclear reactions from both Lawrence Livermore Laboratory and KMS Fusion exceed neutron radiation levels of $10^7$. Russian reports indicate several years of successful operation with pulsed reactors with peak fluxes during 0.5 microsecond bursts in the $10^{16}$n/cm$^2$-sec. range using five to 50 pulses per second.

Many patents have issued in the U.S.A. and abroad in the fusion field. Representative publications are:

(1) *Research/Development*, May 1975, Vol. 26, No. 5, pages 55ff., "Thermonuclear fusion research with high power lasers";

(2) *Nuclear Technology*, Vol. 22, April 1974, pp 36ff., "The relevance of various neutron sources to fusion-reactor radiation effects";

(3) *Plasma Physics and Controlled Nuclear Fusion Research*, 1974, Vol. II, "Experimental Study of Laser-Driven Compression of Spherical Glass Shells";

(4) *Laser Focus*, September 1975, pp 39ff., "More Evidence that Fusion Works".

The usual thermochemical water splitting processes and like other chemical disassociation processes are characterized by practical limitations on the temperature and free energy changes of at least some individual reaction steps.

For any thermal process with an energy absorption at a high temperature $T_H$, and an energy release at a low temperature $T_c$, the minimum positive entropy change as set forth for example, by B. M. Abraham and F. Schreiner, in *Ind. Eng. Chem.* 13, 305 (1974), in the high temperature step of a two step process, is:

$$\Delta S_H \geq \frac{\Delta G_f^o(H_2)}{T_H - T_c} . \qquad \text{(EQN. 1)}$$

For non-pyrochemical processes, i.e., where $T_H \leq 1000°$ C., using $$\Delta G_f^o(H_2O,l) = -56,690 \text{ cal/gmole}$$

for the reaction $$H_2 + \tfrac{1}{2}O_2 \rightarrow H_2O(l)$$

and assuming that $T_C = 300°$ K., from EQN (1),

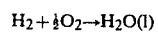
$\Delta S_H \geq 58.3$ cal/gmole°K. (e.u.).

Since $\Delta S$ for most conventional thermochemical reactions is 30 to 40 e.u., it is not likely that a two step cycle to split water can be found if one is constrained to use chemical processes which must then divide the entropy change among several processing steps. As a result, multiple low and intermediate thermochemical reaction steps must be used to achieve large total free energy changes and total entropy changes which equal the sum required. Because of temperature restrictions on vessels and other materials through which reaction heat must be transferred, it is generally accepted by persons skilled in the current state of the chemical processing art that the maximum economically attainable Gibbs free energy change for any single thermochemical reaction step is in the range of 10 to 20 kcal/mole.

This generalization can be understood from thermodynamic principles when we recognize that for usual temperatures $\Delta S_H \leq 20$ e.u. and $$\Delta G = \Delta H - T\Delta S.$$

It is commonly the case that $\Delta H$ is a slowly varying function of the temperature so that, neglecting any variation in $\Delta H$, the maximum reduction in $\Delta G$ accomplished by raising the temperature from 298° K. to 1273° K. is less than or equal to about 19.5 kcal/gmole.

Furthermore, even where the energy change required in the individual reaction steps is sufficiently low the rates of reaction for the individual process steps are often too slow at normal thermochemical temperatures or the heat energy applied takes considerable time to heat the chemicals being reacted the process may not be economically viable.

Objectives

Accordingly, it is an objective of the present invention to provide processes for the decomposition of water and similar compounds with fewer processing steps.

Another object of this invention is to use the blast wave of a thermonuclear reaction to achieve automatic drive for process step kinetics by supplying high pressures and temperatures that quickly initiate the desired pyrochemical reactions.

Still another object of the invention is to utilize the high temperatures available in a blast wave in the space of a central thermonuclear reactor chamber for processing chemical reactions requiring high energy, thereby eliminating stringent requirements of processing equipment, vessels and materials for confining the reactions.

Further, an objective is to provide chemical decomposition processes in which the entropy criterion is reduced because the high temperature step is accomplished pyrochemically.

Yet a further objective is to provide chemical decomposition pyrochemical processes in which the reaction rates of the individual process steps are higher than those achieved in normal thermochemical processes.

BRIEF DESCRIPTION OF THE INVENTION

As an example, if $T_H = 3300°$ K., then $\Delta S_H \geq 18.9$ e.u., an entropy change commonly encountered in chemical processing, which therefore permits a reaction step having a high energy requirement such as the standard Gibbs free energy change at 298° K. in the range of 10 to 20 kcal/mole or higher to be accomplished in a single reaction step.

In accordance with the present invention, the reaction step or steps of a selected chemical decomposition process which has a high energy change or which has a slow thermochemical rate of reaction is carried out in the wake of the outward propagation of the blast wave within the central reaction chamber of a laser ignited (D-T) deuterium-tritium fusion thermonuclear reactor.

The conditions which apply in the wake of the blast wave traversing the central reaction chamber from a fusion thermonuclear reaction may be utilized to relieve the more stringent thermodynamic conditions for thermochemical decomposition processes, in much the same way as they act in the direct thermal dissociation of water, with the added advantage that the practical separation and extraction requirements can be more easily met. For example, the reactor is valved to work as a two stroke internal combustion engine where the blast wave will actuate exhaust valving to extract the product gases, and when the pressure decreases to a predetermined value, inlet valves are opened to insert a charge of feed gases. For each charge a D-T pellet is injected and ignited, so there is not a continuous heating duty cycle on the vessels and equipment. Such ultra high temperature cycles will henceforth be referred to as "pyrochemical" to distinguish them from the usual thermochemical cycles which, for purposes of the following specification and claims, is limited to $T_H \leq 1000°$ C.

THE DRAWING

The drawing is a schematic sketch showing the pyrochemical blast wave reaction process in the central fusion reaction chamber.

THE DETAILED DESCRIPTION

In the central reaction chamber, the temperature in the expanding blast wave surrounding the burning pellet will be moderated to temperatures in the order of 3500° K. to 5000° K., and local pressures which may be thousands of atmospheres early in the development of the blast wave, are moderated to several hundred atmospheres by the expansion of the blast wave and the pyrochemical reactions taking place. Since the conditions are dynamic wide excursions will take place over very small time intervals measured in microseconds. This unique condition provides an automatic drive for the reaction kinetics via substantially instantaneous heat transfer to the reaction at very high temperatures. If a fraction x of the energy released is to be converted to bound internal energy (i.e., "chemical" binding energy) of the products (assuming reasonable local thermodynamic equilibrium reaction rates of the encountered temperatures and pressures) and the balance $(1-x)$ into sensible heat of the products at a temperature $T_p$, then to a first approximation, the blast wave temperature $T_s$ will be driven up to at least the temperature necessary to initiate and drive the reaction to x conversion, and the temperature down to $T_p$. This presupposes that x is appreciable and that $$\frac{d\ln K_p}{d\ln T_p} \geq 0$$

wherein ln designates the natural log function, $T_p$ is the temperature of the product gases, and $K_p$ is the usual chemical equilibrium constant for the product.

These conditions have essentially no analog in the thermochemical processing industry. Reaction materials within the reaction chamber are heated locally over short time spans in what amounts to a microscopic equivalent of the usual thermochemical reaction process. Thus, confinement in the conventional sense into vessels of exotic materials that stand the very high processing temperatures and pressures over long periods of time is not a necessity. Processing chemical reactions requiring higher values of energy change therefore becomes feasible without the penalties associated with large separation and recycle costs in conventional systems requiring more processing steps or vessels withstanding continuous very high pressures and temperatures. The process herein described utilizes these conditions and methods to accomplish the more effective processing detailed.

Three closed-loop water decomposition processes may be outlined in equation form as follows:

$$H_2O + X \longrightarrow H_2 + XO \qquad (1)$$
$$XO \longrightarrow X + \tfrac{1}{2} O_2*$$

$$H_2O + 2Y \longrightarrow 2HY + \tfrac{1}{2} O_2* \qquad (2)$$
$$2HY \longrightarrow H_2 + 2Y$$

$$XY \longrightarrow X + Y \qquad (3)$$
$$X + H_2O \longrightarrow XO + H_2$$
$$XO + Y \longrightarrow XY + \tfrac{1}{2} O_2$$

Depending upon the characteristics of the chosen reagents X and Y, each of the above processes may have at least one reaction step with a standard Gibbs free energy change at 298° K. about 10 to 20 kcal/mole. (Those reaction steps indicated above by an asterisk (*) are those which are usually the high energy steps for the given processes.) When such a step is carried out in the central reaction chamber of a thermonuclear reactor significant economic advantages result from reducing steps, decreasing reaction times and providing automatic intermittent drive through a medium that does not require extremely expensive vessel materials. Some or all of the remaining steps in each case may be carried out according to the usual thermochemical processes. It will be understood, of course, that a convenient source of required energy for the thermochemical step or steps will be residual thermonuclear energy expended in or through the outside wall of the central reaction chamber.

As an example of process (1) above, the following may be considered:

$$H_2O + CO \rightarrow CO_2 + H_2$$

$$CO_2 \rightarrow CO + \tfrac{1}{2} O_2$$

The first reaction step, the reaction of carbon monoxide with water which is the well-known water/gas shift reaction, has a Gibbs free energy change of 7 kcal/mole and may be achieved by the usual thermochemical methods. The second reaction step, however, which is the decomposition of carbon dioxide has a Gibbs free energy change of 94 kcal/mole and, in accordance with the present invention, may be carried out in the central reaction chamber of a thermonuclear reactor.

The carbon dioxide is injected, preferably in gaseous form, into the central reaction chamber. A thermochemical fuel pellet of deuterium-tritium, for example, is then injected into the chamber and ignited by a high intensity laser beam so that thermonuclear fusion takes place in the conventional manner. Ignition and burn of the fuel pellet releases a quantity of thermal energy over a small time period which initiates a blast wave propagating outward from the ignition and burn location. During this process, the carbon dioxide decomposition step proceeds pyrochemically at a very fast rate. The gas product molecules of carbon monoxide and oxygen have a high thermal energy level and exist at high pressure and temperature in a mass flow spherical shell behind and propagating with the blast wave. The chamber exhaust may be then funneled and fed to any suitable gas separator to yield the individual exhaust products.

In the specific example given, the separated carbon monoxide gas product of reaction step two is then reacted thermochemically with water as described above to yield hydrogen and carbon dioxide. Once the carbon dioxide is separated from the hydrogen product of reaction step one, it may be fed to the reaction chamber to form a closed-loop process for the decomposition of water. This process is also the subject of a separate application of Russell D. O'Neal et al., Ser. No. 548,230, filed Feb. 10, 1975.

As an example of process (2) above, the following may be considered:

$$H_2O + Br_2 \rightarrow 2HBr + \tfrac{1}{2}O_2$$

$$2HBr \rightarrow H_2 + Br_2$$

The first reaction step, the reaction of water with bromine, has a Gibbs free energy change of 31 kcal/mole. The second reaction step which is the decomposition of hydrogen bromide has a Gibbs free energy change of only 13 kcal/mole and may be carried out electrolytically or thermochemically at temperatures much less than 1000° C. Again, one of the products, bromine, of step two may be used in step one to form a closed-loop water decomposition process.

The following is an example of process (3):

$$6FeCl_3 \rightarrow 6FeCl_2 + 3Cl_2$$

$$6FeCl_2 + 8H_2O \rightarrow 2Fe_3O_4 + 12HCl + 2H_2$$

$$2Fe_3O_4 + 3Cl_2 + 12HCl \rightarrow 6FeCl_3 + 6H_2O + O_2$$

In this example, process step two has a Gibbs free energy change of 59 kcal/mole of $FeCl_2$ and, in accordance with the present invention, is carried out pyrochemically in the central reaction chamber. Iron oxide and hydrogen chloride products are formed rapidly because of the high driving temperature. Reaction steps one and three have free energy changes of 7.5 and $-8$ kcal/mole of $FeCl_3$, respectively, and may be carried out thermochemically.

In the drawing, the central reactor chamber 10 has a pellet injector 11 which intermittently inserts centrally a fusion fuel pellet such as D-T for ignition by laser 12. Chemicals preferably in the form of gases that will permeate the central chamber 10 are injected at 13 through a distributed low pressure inlet valve(s) 14 in the normal chamber inlet passage. The valve(s) when the pressure drops signifying the reaction is over lets the raw chemicals in to replace expended ones to become part of the pyrochemical reaction following ignition. The blast wave 15 expands until the reaction products are exhausted through distributed high pressure outlet valve(s) 16 opened by the blast. Thus, the blast wave pressure front provides automatic kinetic drive to the process.

The output products may be thermochemically reacted by conventional techniques in reactor 17 outside the thermonuclear reactor, which is heated through heat exchanger 18 deriving heat from reactor blanket 19 by conventional lithium flow methods for example. Thus, the separator 20 provides output products such as $H_2$ and recirculates through channel 21 the original chemical replacement for a closed-loop cycle. Separator 22 derives from the reactor exhaust products the output element $O_2$, for example, before sending residue materials to thermochemical reactor 17. Thereby the only expendible feed chemical product needed at 23 is water for a corresponding process producing $O_2$ and $H_2$ output elements.

Since the pressures, temperatures, chemical reactions of these system components are known in the art, they can be selected along with necessary pumps and separator processes to conform with the particular chemicals and system parameters to be used.

From the foregoing description, it will now be apparent that there has been provided, in accordance with the present invention, improved closed-loop processes for the decomposition of water which fully satisfy all of the objects, aims and advantages set forth above. Furthermore, it will be evident that, while the invention has been disclosed with reference to several specific example processes, each of which has a single process step having a Gibbs free energy change above 10 to 20 kcal/mole, the inventive concepts disclosed may be used in processes having more than one high-energy reaction step by using more than one reactor, or by using the same reactor for successive process steps. Many other alternatives, modifications and variations will also suggest themselves to persons skilled in the art in view of the foregoing description. Accordingly, the invention is intended to embrace all such alternatives, modifications and variations as fall within the spirit and broad scope of the appended claims.

What is claimed is:

1. The pyrochemical process of decomposition of a chemical raw material which includes water or $CO_2$ into at least one constituent element in a high energy process in a single thermal step comprising the step of introducing the chemicals into a central reactor chamber with a deuterium-tritium nuclear fuel pellet, irradiating the pellet to produce a deuterium-tritium nuclear reaction of which a fraction of the energy released appears in an expanding blast wave front over a small fraction of a second, chemically decomposing said chemicals in the high temperatures and high pressures introduced by said blast wave, driving the reaction elements wherein the step of removing the constituent element from the reaction chamber comprises opening a distributed valve(s) in said central reactor by said blast wave front to expel said element from said central chamber as a part of the kinetic drive action performed by said blast wave outwardly in the reactor chamber toward an enclosure wall by nuclear reaction, and removing the reaction products from said chamber thereby to produce said constituent element.

2. The process defined in claim 1 comprising a closed-loop cycle with said chemical raw material consisting of $CO_2$ and said element constituting $O_2$ wherein in further reaction steps $H_2O + CO \rightarrow CO_2 + H_2$ is thermochemically processed outside said chamber to derive $CO_2$ and $H_2$ as a product gas, and the $CO_2$ is recirculated through said chamber as the raw material, whereby water constitutes the only expendible material.

3. The process defined in claim 1 comprising a closed-loop cycle with chemical raw material consisting of $H_2O + Br_2$ to produce constituent element $O_2$, wherein a second reaction step $2HBr \rightarrow H_2 + Br_2$ is thermochemically achieved outside said chamber to produce $H_2$ plus $Br_2$ and the $Br_2$ is recycled into said pyrochemical process step as a raw material thereby expending only water in the process.

4. The process defined in claim 1 with said raw material consisting of $FeCl_2$ and $H_2O$ to produce said constituent element $H_2$.

* * * * *